US012473882B2

(12) United States Patent
Liu

(10) Patent No.: US 12,473,882 B2
(45) Date of Patent: Nov. 18, 2025

(54) PORTABLE BACKUP STARTING DEVICE FOR VEHICLE

(71) Applicant: Shenzhen Zhanpusida Technology Co., Ltd., Guangdong (CN)

(72) Inventor: Yong Liu, Guangdong (CN)

(73) Assignee: Shenzhen Zhanpusida Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/967,692

(22) Filed: Dec. 4, 2024

(65) Prior Publication Data

US 2025/0264081 A1    Aug. 21, 2025

(30) Foreign Application Priority Data

Feb. 19, 2024  (CN) .......................... 202410185694.4
Feb. 19, 2024  (CN) .......................... 202420312559.7

(51) Int. Cl.
*F02N 11/12* (2006.01)
*F02N 11/08* (2006.01)
(Continued)

(52) U.S. Cl.
CPC .......... *F02N 11/12* (2013.01); *F02N 11/0862* (2013.01); *F02N 11/087* (2013.01);
(Continued)

(58) Field of Classification Search
None
See application file for complete search history.

(56) References Cited

U.S. PATENT DOCUMENTS 4,309,622 A * 1/1982 Cottrell ............... H02J 7/00304
                                                  307/130
9,263,907 B2 * 2/2016 Richardson ............. B60L 53/62
(Continued)

FOREIGN PATENT DOCUMENTS

AU    2015301523 A1 *  3/2017  .............. F02N 11/12
AU    2015301523 B2 *  7/2018  .............. F02N 11/12
(Continued)

OTHER PUBLICATIONS

International Search Report of PCT Patent Application No. PCT/CN2025/076690 issued on May 5, 2025.
(Continued)

*Primary Examiner* — Kevin R Steckbauer
(74) *Attorney, Agent, or Firm* — Westbridge IP LLC

(57) ABSTRACT

Provided is portable backup starting device for vehicle. The device includes internal power source, switching circuit, first voltage detecting circuit, first electrode clip, and second electrode clip, wherein the first electrode clip and the second electrode clip are configured to connect to the first end and the second end of vehicle load; the internal power source has first electrode and second electrode, wherein the first electrode is coupled to the first electrode clip, and the second electrode is coupled to the switching circuit; and the switching circuit is coupled to the second electrode clip, wherein the first voltage detecting circuit is coupled to the switching circuit, the first electrode, and the second electrode for detecting first voltage between the first electrode and the second electrode before the switching circuit conducts, and the switching circuit does not conduct when the first voltage meets first preset condition.

19 Claims, 7 Drawing Sheets

(51) Int. Cl.
  *H02J 1/10*  (2006.01)
  *H02J 7/00*  (2006.01)

(52) U.S. Cl.
  CPC ........ *H02J 1/122* (2020.01); *F02N 2200/063* (2013.01); *F02N 2200/065* (2013.01); *F02N 2200/066* (2013.01); *F02N 2300/106* (2013.01); *H02J 7/00304* (2020.01); *H02J 7/00308* (2020.01); *H02J 7/0036* (2013.01); *H02J 7/0047* (2013.01); *H02J 7/0063* (2013.01); *H02J 2310/46* (2020.01); *H02J 2310/70* (2020.01)

(56) References Cited

U.S. PATENT DOCUMENTS

| | | | |
|---|---|---|---|
| 9,579,990 B2 * | 2/2017 | Butler | B60L 53/22 |
| 9,662,991 B2 * | 5/2017 | Richardson | H02J 7/00308 |
| 10,141,737 B2 * | 11/2018 | Lei | H02J 7/0036 |
| 10,148,105 B2 * | 12/2018 | Lei | H02J 7/0063 |
| 10,875,410 B2 * | 12/2020 | Wang | B60L 53/53 |
| 10,981,452 B2 * | 4/2021 | Nook | B60L 50/60 |
| 11,072,256 B2 * | 7/2021 | Butler | B60L 53/22 |
| 11,104,236 B2 * | 8/2021 | Wang | H02J 7/0068 |
| 11,124,077 B2 * | 9/2021 | Wang | H02J 7/342 |
| 11,235,673 B2 * | 2/2022 | Wang | H02J 7/0036 |
| 11,254,213 B2 * | 2/2022 | Nook | H01M 10/425 |
| 11,322,897 B2 * | 5/2022 | Wu | H01R 13/70 |
| 11,376,971 B2 * | 7/2022 | Wang | H02J 7/0068 |
| 11,682,919 B2 * | 6/2023 | Lei | H02J 7/0034 307/64 |
| 11,701,969 B2 * | 7/2023 | Nook | H01M 10/441 320/105 |
| 11,837,895 B2 * | 12/2023 | Rumbaugh | H02J 7/0036 |
| 11,971,003 B2 * | 4/2024 | Liu | F02N 11/087 |
| 11,979,045 B2 * | 5/2024 | Lei | H02J 1/122 |
| 12,097,773 B2 * | 9/2024 | Nook | B60L 3/0046 |
| 12,149,069 B2 * | 11/2024 | Liao | H02J 7/0047 |
| 12,171,079 B1 * | 12/2024 | Liu | F02N 11/12 |
| 12,228,101 B2 * | 2/2025 | Liu | F02N 11/12 |
| 2006/0145655 A1 * | 7/2006 | Sheng | H02J 7/0034 320/105 |
| 2016/0046199 A1 * | 2/2016 | Butler | H02J 7/0048 320/106 |
| 2016/0241027 A1 * | 8/2016 | Lei | H02J 7/0034 |
| 2016/0303989 A1 * | 10/2016 | Lei | H02J 7/007182 |
| 2017/0066342 A1 * | 3/2017 | Butler | H02J 7/005 |
| 2020/0028368 A1 * | 1/2020 | Nook | H02J 7/0034 |
| 2020/0259340 A1 * | 8/2020 | Nook | H01M 10/441 |
| 2021/0135466 A1 * | 5/2021 | Rumbaugh | H02J 1/122 |
| 2021/0155096 A1 * | 5/2021 | Nook | B60L 3/0046 |
| 2021/0354582 A1 * | 11/2021 | Butler | G06Q 50/00 |
| 2022/0069574 A1 * | 3/2022 | Liao | H02J 7/342 |
| 2023/0053161 A1 * | 2/2023 | Liu | H02J 1/122 |
| 2023/0187932 A1 * | 6/2023 | Cai | H03K 17/78 320/105 |
| 2023/0294519 A1 * | 9/2023 | Nook | B60L 3/0046 320/105 |
| 2024/0209823 A1 * | 6/2024 | Liu | F02N 11/12 |
| 2024/0399876 A1 * | 12/2024 | Nook | H02J 1/122 |
| 2025/0023345 A1 * | 1/2025 | Liao | H02J 1/122 |

FOREIGN PATENT DOCUMENTS

| | | | | |
|---|---|---|---|---|
| AU | 2018241089 A1 * | 10/2018 | | B60L 53/305 |
| AU | 2018243593 A1 * | 10/2019 | | H02J 7/342 |
| AU | 2018243593 A2 * | 3/2020 | | B60L 3/0046 |
| AU | 2018241089 B2 * | 12/2020 | | H02J 7/0048 |
| AU | 2018243593 B2 * | 9/2021 | | H02J 1/122 |
| AU | 2021290267 A1 * | 1/2022 | | H02J 1/122 |
| AU | 2023203625 A1 * | 7/2023 | | B60L 3/0046 |
| AU | 2023248179 A1 * | 11/2023 | | B60L 3/0046 |
| CA | 3065290 A1 * | 10/2018 | | H02J 7/342 |
| CA | 3157140 A1 * | 5/2021 | | F02N 11/12 |
| CA | 2958151 C * | 10/2023 | | H02J 7/0048 |
| CN | 110011371 A * | 7/2019 | | H02G 3/02 |
| CN | 114946099 A * | 8/2022 | | H02J 7/0036 |
| CN | 114962112 A | 8/2022 | | |
| CN | 217682063 U | 10/2022 | | |
| CN | 115596590 A | 1/2023 | | |
| CN | 110011371 B * | 10/2023 | | H02J 7/0047 |
| CN | 118017645 A * | 5/2024 | | H02J 7/0047 |
| EP | 3180832 B1 * | 9/2020 | | H02J 7/0048 |
| JP | 2020516219 A * | 5/2020 | | H02J 1/122 |
| TW | 202135417 A * | 9/2021 | | H01M 50/502 |
| WO | WO-2016025861 A1 * | 2/2016 | | B60L 53/22 |
| WO | WO-2017124148 A1 * | 7/2017 | | F02N 11/087 |
| WO | WO-2018183864 A1 * | 10/2018 | | B60L 58/22 |
| WO | WO-2019190588 A1 * | 10/2019 | | H02J 7/0014 |
| WO | WO-2020177467 A1 * | 9/2020 | | H02J 7/0047 |
| WO | WO-2021091895 A1 * | 5/2021 | | H01M 50/502 |
| WO | WO-2022016234 A1 * | 1/2022 | | H01M 50/296 |

OTHER PUBLICATIONS

Written Opinion of PCT Patent Application No. PCT/CN2025/076690 issued on May 5, 2025.

* cited by examiner

PORTABLE BACKUP STARTING DEVICE FOR VEHICLE

CROSS-REFERENCE TO RELATED APPLICATION

The present disclosure claims priority to Chinese patent Application No. 2024203125597, filed with the Chinese Patent Office on Feb. 19, 2024 and to Chinese patent Application No. 2024101856944, filed with the Chinese Patent Office on Feb. 19, 2024, the entire contents of which are incorporated herein by reference.

TECHNICAL FIELD

The present disclosure relates to the technical field of automobile, and in particular to a portable backup starting device for vehicle.

BACKGROUND ART

The automobile often encounters a problem that it cannot start during use, e.g., when the automobile cannot start due to various reasons of automobile batteries, such as low temperature, aging, or being long-time unused, the vehicle can be started by a portable backup emergency starting device at this time. However, during actual use, various different abnormal conditions often appear, such as an excessive output current, and insufficient voltage of the internal power source. If these problems cannot be solved by the starting device, it may cause certain damage to the vehicle circuit or the starting device itself.

SUMMARY

In view of this, the embodiments of the present disclosure provide a portable backup starting device for vehicle, which can effectively solve problems such as safety in the vehicle starting in the prior art.

In a first aspect, the embodiments of the present disclosure provide a portable backup starting device for vehicle, including: an internal power source, a switching circuit, a first voltage detecting circuit, a first electrode clip, and a second electrode clip, wherein the first electrode clip and the second electrode clip are configured to connect to a first end and a second end of a vehicle load;
the internal power source has a first electrode and a second electrode, wherein the first electrode is coupled to the first electrode clip, and the second electrode is coupled to the switching circuit;
the switching circuit is coupled to the second electrode clip; and
the first voltage detecting circuit is coupled to the switching circuit, the first electrode, and the second electrode for detecting a first voltage between the first electrode and the second electrode before the switching circuit conducts, wherein the switching circuit does not conduct when the first voltage meets a first preset condition.

The embodiments of the present disclosure include the following beneficial effects.

The portable backup starting device for vehicle of the embodiments of the present disclosure includes the internal power source, the switching circuit, the first voltage detecting circuit, the first electrode clip, and the second electrode clip, wherein the first electrode clip and the second electrode clip are configured to connect to the first end and the second end of the vehicle load; the internal power source has the first electrode and the second electrode, wherein the first electrode is coupled to the first electrode clip, and the second electrode is coupled to the switching circuit; the switching circuit is coupled to the second electrode clip; and the first voltage detecting circuit is coupled to the switching circuit, the first electrode, and the second electrode, wherein the first voltage detecting circuit is configured to detect the first voltage between the first electrode and the second electrode before the switching circuit conducts, and the switching circuit does not conduct when the first voltage meets the first preset condition. The device can effectively solve problems such as safety in the vehicle starting in the prior art, e.g., when the voltage of the internal power source is insufficient, the conduction of the switching circuit is controlled to be suspended to enter a state of protecting the internal power source.

BRIEF DESCRIPTION OF DRAWINGS

In order to more clearly illustrate the technical solutions in the embodiments of the present disclosure, the drawings to be used in the embodiments will be briefly introduced below. It is to be understood that the following drawings only show certain embodiments of the present disclosure, and therefore should not be regarded as a limitation of the scope. For persons of ordinary skill in the field, other relevant drawings can be obtained based on these drawings without inventive efforts.

MAIN REFERENCE NUMBERS

Figure 1:
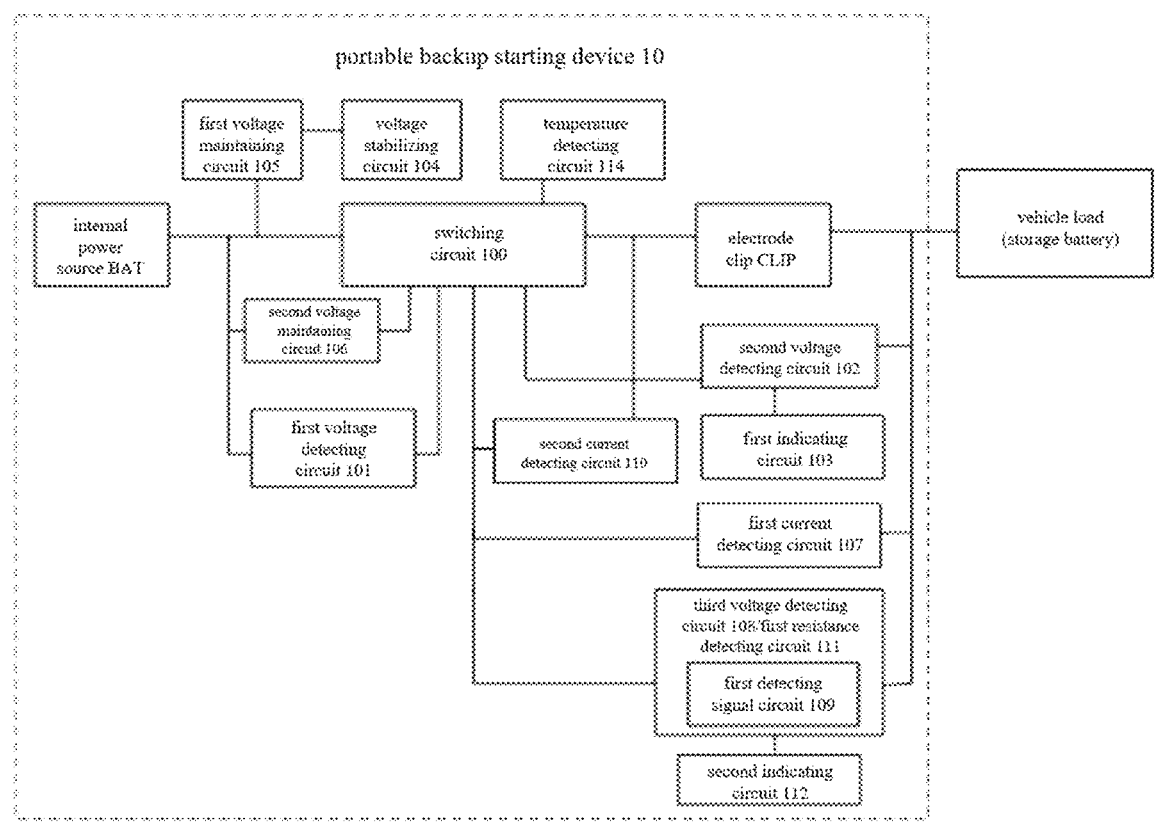
FIG. 1 shows a first structure schematic diagram of a portable backup starting device for vehicle of the embodiments of the present disclosure.

10—portable backup starting device for vehicle; BAT—internal power source; CLIP—electrode clip; 100—switching circuit; 101—first voltage detecting circuit; 102—second voltage detecting circuit; 103—first indicating circuit; 104—voltage stabilizing circuit; 105—first voltage maintaining circuit; 106—second voltage maintaining circuit; 107—first current detecting circuit; 108—third voltage detecting circuit; 109—first detecting signal circuit; 110—second current detecting circuit; 111—first resistance detecting circuit; 112—second indicating circuit; 113—second detecting signal circuit; and 114—temperature detecting circuit.

DETAILED DESCRIPTION OF EMBODIMENTS

The technical solutions in the embodiments of the present disclosure will be clearly and completely described in conjunction with the drawings in the embodiments of the present disclosure. It is clear that the embodiments described are partial embodiments of the present disclosure, but not all of the embodiments.

The components in the embodiments of the present disclosure generally described and shown in the drawings herein may be arranged and designed in multiple different configurations. Therefore, the following detailed description of embodiments of the present disclosure provided in the drawings is not intended to limit the scope of the present disclosure for which protection is claimed, but rather represents only selected embodiments of the present disclosure. Based on the embodiments of the present disclosure, all other embodiments obtained by a person of ordinary skill in the art without inventive efforts, shall fall within the scope of protection of the present disclosure.

In the following text, the terms "include", "have," and their cognates used in various embodiments of the present disclosure, are intended only to represent a particular feature, number, step, operation, device, component, or combination of the foregoing, and should not be understood as precluding the existence of one or more other features, numbers, steps, operations, devices, components, or combinations of the foregoing, or improving the possibility of one or more other features, numbers, steps, operations, devices, components, or combinations of the foregoing. Furthermore, the terms "first", "second", "third", etc., are used only to differentiate the description, and are not to be understood as indicating or implying relative importance.

Unless otherwise defined, all terms (including technical terms and scientific terms) used herein have the same meaning as commonly understood by those of ordinary skill in the art to which the various embodiments of the present disclosure belong. The terms (such as those defined in dictionaries in general use) will be explained to have the same meaning as the contextual meaning in the relevant field of technology, and will not be explained to have an idealized meaning or an overly formalized meaning, unless clearly defined in various embodiments of the present disclosure.

Referring to FIG. 1 to FIG. 8, some embodiments of the present disclosure are illustrated in detail below. The following embodiments and features in the embodiments may be combined with each other without conflict.

FIG. 1 shows a structure schematic diagram of a portable backup starting device 10 for vehicle of the embodiments of the present disclosure.

Exemplarily, the portable backup starting device 10 for vehicle includes: an internal power source BAT, a switching circuit 100, a first voltage detecting circuit 101, and the electrode clip CLIP including a first electrode clip and a second electrode clip. Specifically, the first electrode clip and the second electrode clip are configured to connect to the first end and the second end of a vehicle load; the internal power source BAT has the first electrode and the second electrode, wherein the first electrode is coupled to the first electrode clip, and the second electrode is coupled to the switching circuit 100; and the switching circuit 100 is coupled to the second electrode clip. The first voltage detecting circuit 101 is coupled to the switching circuit 100, the first electrode, and the second electrode. The first voltage detecting circuit 101 is configured to detect the first voltage between the first electrode and the second electrode before the switching circuit 100 conducts, wherein the switching circuit 100 does not conduct when the first voltage meets the first preset condition, and conducts when the first voltage does not meet the first preset condition.

In the present disclosure, the vehicle load refers primarily to the vehicle storage battery. It is to be understood that the terms "first" and "second" in the present disclosure are used only to distinguish two different electrode clips or electrodes for ease of description, wherein the first electrode clip may be a negative electrode clip CLIP−, or a positive electrode clip CLIP+; and the first electrode on the internal power source BAT may be either a negative BAT− or a positive BAT+. For example, when the first electrode clip is the negative electrode clip CLIP− and the second electrode clip is the positive electrode clip CLIP+, correspondingly, the first electrode coupled to the first electrode clip shall be the negative BAT−, and the second electrode coupled to the second electrode clip shall be the positive BAT+. Alternatively, when the first electrode clip is the positive electrode clip CLIP+ and the second electrode clip is the negative electrode clip CLIP−, correspondingly, the first electrode coupled to the first electrode clip is the positive BAT+, and the second electrode coupled to the second electrode clip is the negative BAT−.

Considering that if it still charges for the vehicle when the voltage of the internal power source BAT is too low, the internal power source BAT may be damaged irreversibly, e.g., the active substances on the electrodes in the internal power source BAT may be damaged and loose the reaction capacity, thereby shortening the life of the internal power source BAT. The embodiment detects the voltage state of the internal power source BAT by the first voltage detecting circuit 101 to determine whether it meets the first preset condition, and controls the switching circuit not to conduct when meeting, so that the internal power source BAT does not supply power to the vehicle.

Exemplarily, when detecting a value of the above first voltage is smaller than or equal to a preset low-voltage threshold value, the switching circuit 100 is not conducted, so as to enter a state of protecting the internal power source BAT. It can be understood that the above first preset condition is mainly related to the low-voltage threshold value of the internal power source BAT. It is worth noting that the low voltage protection point of the corresponding single battery may be different for different types and quantities of the battery positive electrode materials, so that the low-voltage threshold value of the entire internal power source BAT may be different, e.g., the low-voltage threshold value $U_{in\_L}=U_1 \times N$, where $U_1$ is the low voltage protection point of the single battery. In the present disclosure, the arrangement of the first preset condition may be adjusted based on the type and quantity of the battery positive electrode material, which is not specifically limited herein.

For example, in the first condition, it adopts the lithium ternary battery or lithium cobaltate battery, i.e., N lithium ternary batteries (i.e., in a number of N) or N lithium cobaltate batteries are connected in series between the first electrode and the second electrode to form the above internal power source BAT, wherein a voltage range of the lithium ternary battery or the lithium cobaltate battery is 3.0V~3.7V, and a typical value is 3.2V. The first preset condition at this time may be that the value of the first voltage is smaller than or equal to 3.2N, where N is the number of batteries in series in the internal power source BAT. For example, if the internal power source BAT is consisted of four lithium ternary batteries in series, the corresponding voltage threshold value $U_{in\_L}=3.2V*4=12.8V$ at this time. That is to say, when the detecting value of the first voltage is smaller than or equal to 12.8V, the switching circuit 100 is controlled to be not conducted.

In the second condition, it adopts the lithium iron phosphate battery, i.e., N lithium iron phosphate batteries are connected in series between the first electrode and the second electrode, wherein a voltage range of the lithium iron phosphate battery is 2.0V~3.2V, and a typical value is 2.5 V. The first preset condition at this time may be that the value of the first voltage is smaller than or equal to 2.5N, where N is the number of batteries in series in the internal power source BAT.

In the third condition, the internal power source BAT adopts the supercapacitor, i.e., N supercapacitors are connected in series between the first electrode and the second electrode, wherein the voltage range of the supercapacitor is 1.8V~2.5V, and a typical value is 2.0 V. The first preset condition at this time may be that the value of the first voltage is smaller than or equal to 2N, where N is the number of supercapacitors in series in the internal power source BAT.

Figure 2:
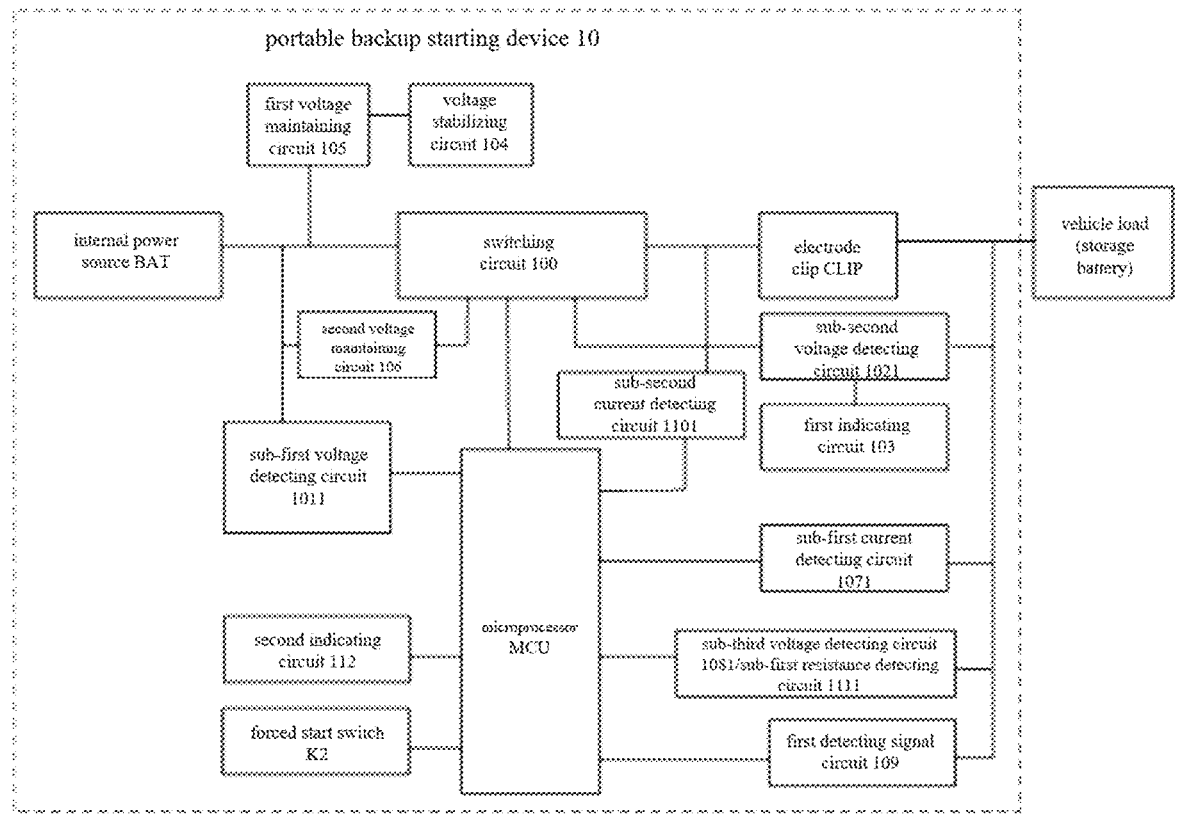
FIG. 2 shows a second structure schematic diagram of a portable backup starting device for vehicle of the embodiments of the present disclosure.

In one embodiment, as shown in FIG. 2, the first voltage detecting circuit 101 includes a sub-first voltage detecting circuit 1011 and a microprocessor MCU. The sub-first voltage detecting circuit 1011 is coupled to the first electrode, the second electrode, and the microprocessor MCU. The sub-first voltage detecting circuit 1011 is configured to detect the first voltage between the first electrode and the second electrode before the switching circuit 100 conducts. The microprocessor MCU is coupled to the switching circuit 100, wherein the microprocessor MCU is configured to control the switching circuit 100 not to conduct when the first voltage meets the first preset condition, and vice versa, the microprocessor MCU is configured to control the switching circuit 100 to conduct when the first voltage does not meet the first preset condition.

Figure 3:
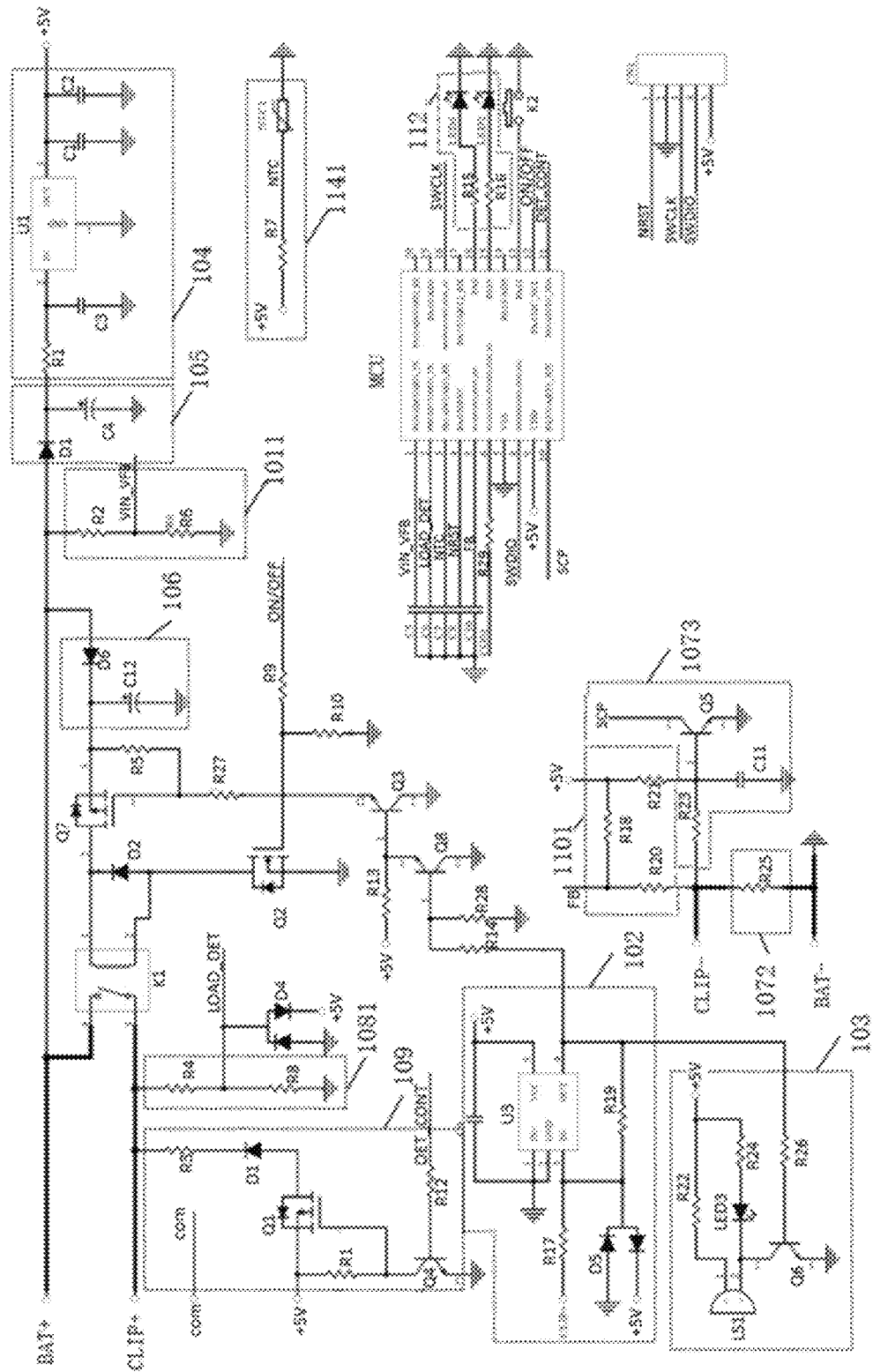
FIG. 3 shows a first circuit schematic diagram of a portable backup starting device for vehicle of the embodiments of the present disclosure.

For example, as shown in FIG. 3, the sub-first voltage detecting circuit 1011 includes the resistances R2 and R6, wherein one end of the resistance R2 is configured to connect to the first electrode or the second electrode of the internal power source BAT to acquire the voltage signal VIN_VFB of the first voltage. Further, the voltage signal VIN_VFB is configured to apply to the first pin (not shown in FIG. 2) of the microprocessor MCU, so that the microprocessor MCU reads the value $U_{in}$ of the first voltage. When the value $U_{in}$ of the first voltage is smaller than or equal to the low-voltage threshold value $U_{in\_L}$, the microprocessor MCU controls the switching circuit 100 not to conduct, but to enter a state of protecting the internal power source BAT.

Further, optionally, the first voltage detecting circuit 101 of the above embodiment can further be configured to detect the overvoltage of the internal power source BAT in some embodiments besides detecting the undervoltage of the internal power source BAT, thus realizing the protection for the internal power source BAT when the voltage is too high.

Exemplarily, when the first voltage detecting circuit 101 detects that the value of the first voltage of the internal power source BAT is larger than or equal to a preset high-voltage threshold value, the switching circuit 100 is controlled to be not conducted, to enter the state of protecting the internal power source BAT. The high-voltage threshold value mainly depends on the type and quantity of the battery positive electrode material of the internal power source BAT. For example, the high-voltage threshold value $U_{in\_H}=U2\times N$, and U2 is the high-voltage protection point of the single battery. For example, the range of the high-voltage protection point of the lithium ternary battery is 4.2V~4.5V, and a typical value is 4.3V; the range of the high-voltage protection point of the lithium iron phosphate batter is 3.65V~4.0V, and a typical value is 3.7V; and the range of the high-voltage protection point of supercapacitor is 2.5V~3.6V, and a typical value is 3.0V, wherein N is the number of batteries in series in the internal power source BAT. Exemplarily, when four lithium ternary batteries are connected in series, the high-voltage threshold value $U_{in\_H}$ is 4.3V×4=17.2V.

It can be understood that the above first voltage detecting circuit 101 is used to protect the internal power source BAT to prevent the internal power source BAT from being damaged.

Figure 5:
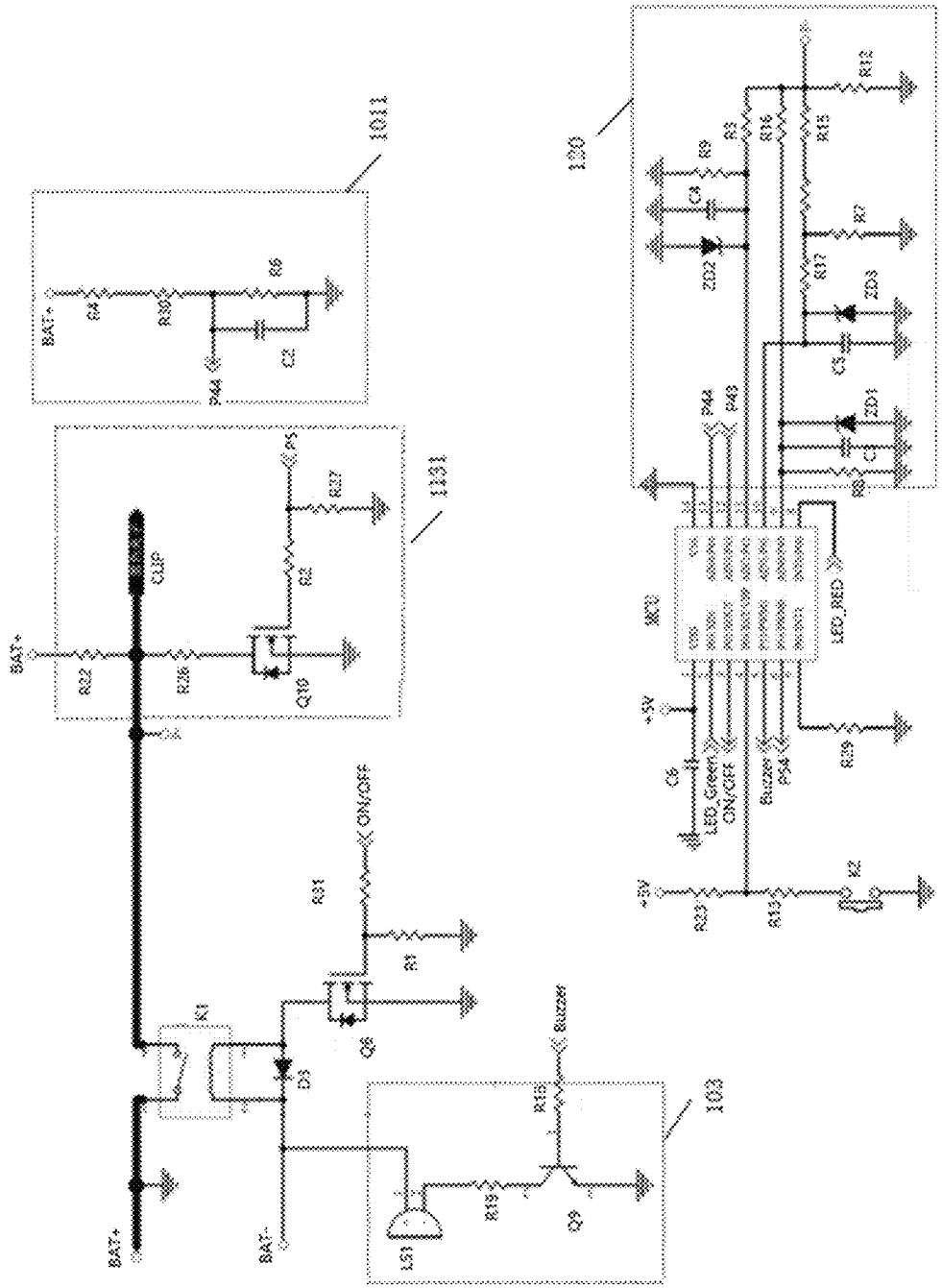
FIG. 5 shows a second circuit schematic diagram of a portable backup starting device for vehicle of the embodiments of the present disclosure.

In another embodiment, as shown in FIG. 5, the sub-first voltage detecting circuit 1011 includes a resistance R4, a resistance R30, a resistance R6, and a capacitor C2, wherein one end of the resistance R4 is used to connect to the first electrode or the second electrode of the internal power source BAT to acquire the voltage signal (which is outputted from the node P44 in FIG. 5) of the first voltage. Further, the acquired voltage signal is inputted into the 13th pin of the microprocessor MCU, so that the microprocessor MCU reads the value $U_{in}$ of the first voltage. When the value $U_{in}$ of the first voltage is smaller than or equal to the low-voltage threshold value $U_{in\_L}$, or when the value $U_{in}$ of the first voltage is larger than or equal to the high-voltage threshold value $U_{in\_H}$, the microprocessor MCU controls the switching circuit 100 not to conduct, but to enter the state of protecting the internal power source BAT.

Figure 6:
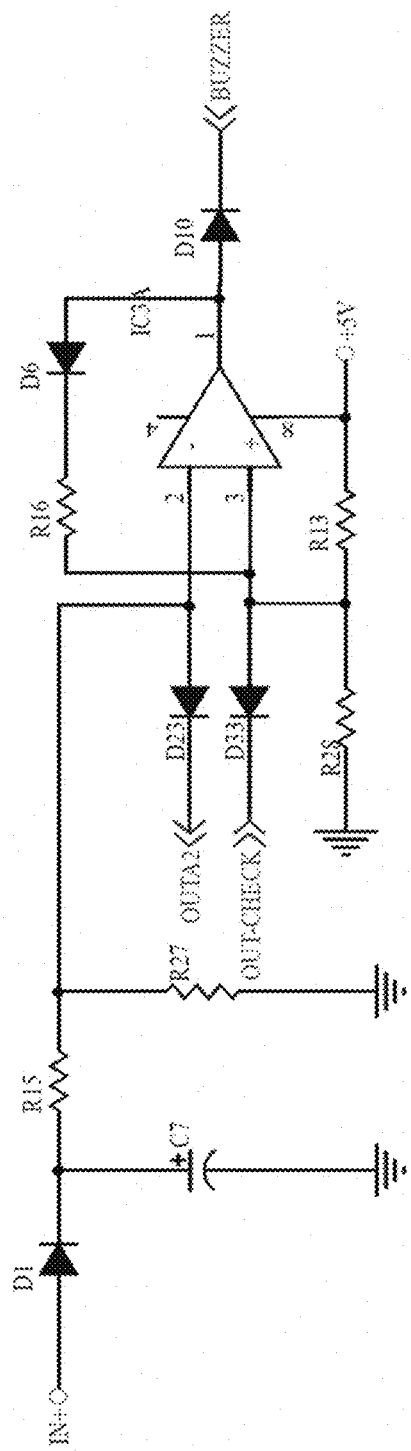
FIG. 6 shows a schematic diagram of a first voltage detecting circuit of the embodiments of the present disclosure.

Additionally, in order to realize the protection for the internal power source BAT when the voltage is too low, in some other embodiments, the first voltage detecting circuit 101 may be the circuit as shown in FIG. 6, which is consisted of an operational amplifier comparator IC3A, diodes D1, D6, D10, D23, and D33, capacitor C7, and resistances R15, R27, R28, R13, and R16, etc. The positive electrode of the diode D1 is connected to the positive electrode of the internal power source BAT, and the negative electrode of the diode D10 is connected to the switching circuit 100. It is understood that when the value $U_{in}$ of the first voltage is smaller than or equal to the low-voltage threshold value $U_{in\_L}$, the first pin of the operational amplifier comparator IC3A outputs a high level signal via the diode D10, wherein the high level signal is used to control the switching circuit 100 to not conduct (or to disconnect). Further, optionally, the high level signal may also be used to drive a buzzer to sound and a light-emitting diode LED to light, so as to indicate that the device is currently in a state of protecting the internal power source BAT.

As another optional embodiment, in some other embodiments, the first voltage detecting circuit 101 includes the sub-first voltage detecting circuit 1011 and the microprocessor MCU, wherein the sub-first voltage detecting circuit 1011 may be the circuit as shown in FIG. 6. When the value $U_{in}$ of the first voltage is smaller than or equal to the low-voltage threshold value $U_{in\_L}$, the first pin of the operational amplifier comparator IC3A outputs the high level signal via the diode D10, and the microprocessor MCU controls the switching circuit 100 not to conduct (or to disconnect) based on the high level signal.

Figure 7:
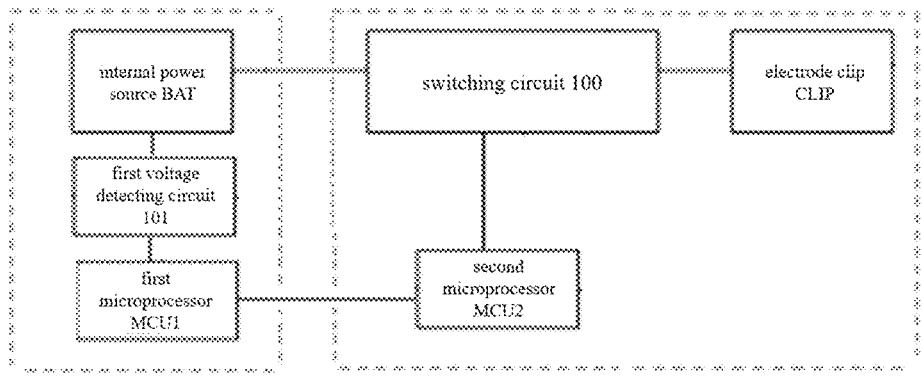
FIG. 7 shows a fourth structure schematic diagram of a portable backup starting device for vehicle of the embodiments of the present disclosure.

Of course, in some other embodiments, the first voltage detecting circuit 101 may further protect the internal power source BAT by the communication cable, or other communication methods. For example, the portable backup starting device 10 for vehicle includes a host side containing the internal power source BAT and a wiring side containing the electrode clip CLIP, and the host side and the wiring side are connected by a physical connector (such as an EC5 connector). As shown in FIG. 7, the host side includes the internal power source BAT, the first voltage detecting circuit 101, and the first microprocessor MCU1; and the wiring side includes the electrode clip CLIP, the switching circuit, and the second microprocessor MCU2. The second microprocessor MCU2 is communicated with the first microprocessor MCU1 by the cable method, such as a cable method of the serial interface (COM). Of course, it may also adopt other communication methods, which are not limited herein. Therefore, when the first microprocessor MCU1 detects that the first voltage meets the first preset condition by the first voltage detecting circuit 101, it is transmitted to the second microprocessor MCU2 by the communication cable, so that the second microprocessor MCU2 controls the switching circuit 100 not to conduct. Optionally, the portable backup starting device 10 for vehicle further includes a detecting unit for temperature monitoring of the internal power source BAT. When the battery temperature of the internal power source BAT reaches a preset temperature range (e.g., it may be 65° C.~90° C. and the typical value is larger than 80° C.), the first microprocessor MCU1 may also transmit to the second microprocessor MCU2 by using the communication cable or other communication methods, so that the second microprocessor MCU2 controls the switching circuit 100 not to conduct (or to disconnect) to enter the state of protecting the internal power source BAT.

Figure 8:
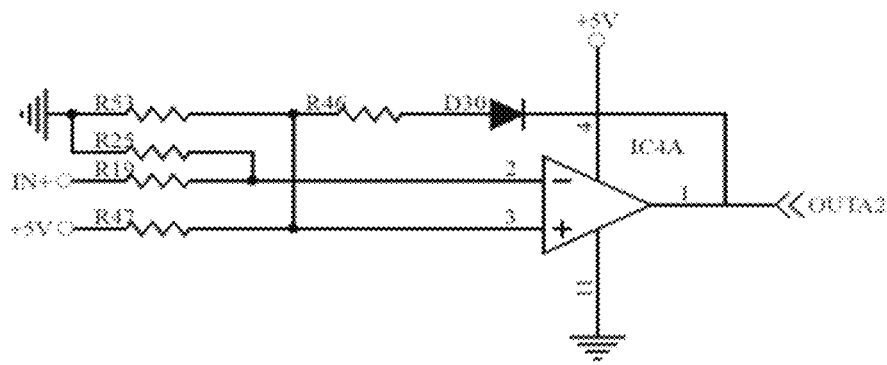
FIG. 8 shows another schematic diagram of a first voltage detecting circuit of the embodiments of the present disclosure.

Similarly, in conjunction with FIG. 6, in order to protect the internal power source BAT when the voltage is too high, in some other embodiments, the first voltage detecting circuit 101 further includes the circuit as shown in FIG. 8, which is consisted of an operational amplifier comparator IC4A, a diode D30, resistances R53, R25, R19, R47, and R46, etc. One end of the resistance R19 is connected to the positive electrode of the internal power source BAT, and the first pin of the operational amplifier comparator IC4A is connected to the negative electrode of the diode D23 in the circuit as shown in FIG. 6. Therefore, when the value $U_{in}$ of the first voltage is larger than or equal to the high-voltage threshold value $U_{in\_H}$, the first pin of the operational amplifier comparator IC4A outputs a low level signal to the negative electrode of the diode D23, and at this time the operational amplifier comparator IC3A outputs a high level signal to control the switching circuit 100 not to conduct, so as to enter the state of protecting the internal power source BAT. Further, optionally, the high level signal may also be used to drive the buzzer to sound and the light-emitting diode LED to light, so as to indicate that the device is currently in a state of overvoltage protection.

In another embodiment, referring to FIG. 1, the portable backup starting device 10 for vehicle further includes a second voltage detecting circuit 102, wherein the second voltage detecting circuit 102 is coupled to the switching circuit 100, the first electrode clip, and the second electrode clip. The second voltage detecting circuit 102 is configured to detect the second voltage between the first end and the second end of the vehicle load before the switching circuit 100 conducts. The switching circuit 100 does not conduct when the first voltage meets the first preset condition or the second voltage meets the second preset condition, and conducts when the first voltage does not meet the first preset condition and the second voltage does not meet the second preset condition. It will be understood that by utilizing the second voltage detecting circuit 102 to detect the voltage state of the vehicle load for controlling the switching circuit 100 to conduct or disconnect, the operation safety and system reliability of the device can be further improved.

For example, this second preset condition may include, but is not limited to that the second voltage is a reverse voltage. It will be understood that the connection states between the first electrode clip and the second electrode clip and the first end and the second end of the vehicle load include a first connection state and a second connection state. The first electrode clip and the first end of the vehicle load have the same electric polarity, and the second electrode clip and the second end of the vehicle load have the same electric polarity. The first connection state is that the first electrode clip is connected to the first end, and the second electrode clip is connected to the second end; and the second connection state is that the first electrode clip is connected to the second end, and the second electrode clip is connected to the first end. The second voltage is the forward voltage in the first connection state, and the second voltage is the reverse voltage in the second connection state. If the voltage on two ends of the vehicle load is detected to be a reverse voltage, the switching circuit 100 is controlled to be not conducted. Further, optionally, the absolute value of the reverse voltage is larger than or equal to 0.1V.

In some other embodiments, the second preset condition may also be that the second voltage is the forward voltage, and the absolute value of the forward voltage is smaller than or equal to 9V. It will be understood that when the voltage difference between two ends of the vehicle load is detected to be forward voltage but the value of the forward voltage is too small, i.e., it is smaller than the normal output voltage 9V, it is necessary to control the switching circuit 100 not to conduct at this time to protect the vehicle load.

In one embodiment, as shown in FIG. 3, the second voltage detecting circuit 102 mainly includes an operational amplifier comparator U3, a resistance R17, a resistance R19, and a diode D5, wherein the input end of the resistance R17 is configured to connect to the vehicle load. When the voltage at the input end of resistance R17 is detected to be lower than a reference voltage, the 4th pin of the operational amplifier comparator U3 outputs a high level signal, wherein the high level signal is used to control the switching circuit 100 not to conduct. The arrangement of the reference voltage should meet that the voltage of the reverse input end of the 3rd pin of the operational amplifier comparator U3 is lower than the voltage of the non-inverting input end of the first pin of the operational amplifier comparator U3.

As an optional embodiment, the second voltage detecting circuit 102 includes a sub-second voltage detecting circuit 1021 and the microprocessor MCU (not shown in the figure). The sub-second voltage detecting circuit 1021 is coupled to the first electrode clip, the second electrode clip, and the microprocessor MCU, and the sub-second voltage detecting circuit 1021 is configured to detect the second voltage between the first end and the second end before the switching circuit 100 conducts. The microprocessor MCU is coupled to the switching circuit 100, and the microprocessor MCU controls the switching circuit 100 not to conduct when the second voltage meets the second preset condition. For example, as shown in FIG. 3, the 4th pin of the operational amplifier comparator U3 may be further connected to the microprocessor MCU based on the second voltage detecting circuit 102 for detecting the vehicle load voltage. When the microprocessor MCU receives the high level signal output from the 4th pin of the operational amplifier comparator U3, the switching circuit 100 is controlled to be not conducted (or to disconnected).

Further, optionally, the portable backup starting device 10 for vehicle further includes a first indicating circuit 103, wherein the first indicating circuit 103 is coupled to the second voltage detecting circuit 102, and makes sounds and/or generates lights when the second voltage meets the second preset condition. It is understood that the user can intuitively know the current operation state of the device by the indications of the sounds/lights, so as to carry out treatments when occurring corresponding troubles, such as forced starting, disconnecting the connection between the electrode clip CLIP and the vehicle load, and other operations.

For example, as shown in FIG. 3, the first indicating circuit 103 includes a buzzer LS1, a resistance R22, a light-emitting diode LED3, a resistance R24, a MOS transistor Q6, and the resistance R26 (which form a driving unit). The first indicating circuit 103 is configured to drive the buzzer LS1 to make the alarm sound indication and the light-emitting diode LED3 to generate a red-light indication when the second voltage detecting circuit 102 detects that the second voltage meets the second preset condition. The operating voltage of the buzzer LS1 is 3V~24V, and the typical value can be 3.3V, 5V, and 12V.

In one embodiment, when the portable backup starting device 10 for vehicle is connected to the vehicle load and meets the condition of conducting the switching circuit 100, the switching circuit 100 is firstly conducted to connect the internal power source BAT to the vehicle load, and then waits for the user to start the vehicle. In order to avoid the internal power source BAT from connecting to the vehicle load for a long duration, the switching circuit 100 in the embodiment will be automatically disconnected after a certain duration, i.e., the internal power source BAT is disconnected from the vehicle load.

Exemplarily, the portable backup starting device 10 for vehicle further includes a first duration control circuit. The first duration control circuit is coupled to the switching circuit 100, and the first duration control circuit is configured to start calculating a first duration after the internal power source BAT is connected to the vehicle load. The switching circuit 100 disconnects the internal power source BAT from the vehicle load when the first duration meets a third preset condition. For example, this first duration control circuit may be the microprocessor MCU, or a timing module, etc.

The third preset condition may be that the above first duration is in a range of 10s-120s, specifically, such as 20s, 30s, 60s, and 80s, which is not limited herein, and can be set according to the actual situation.

Figure 4:
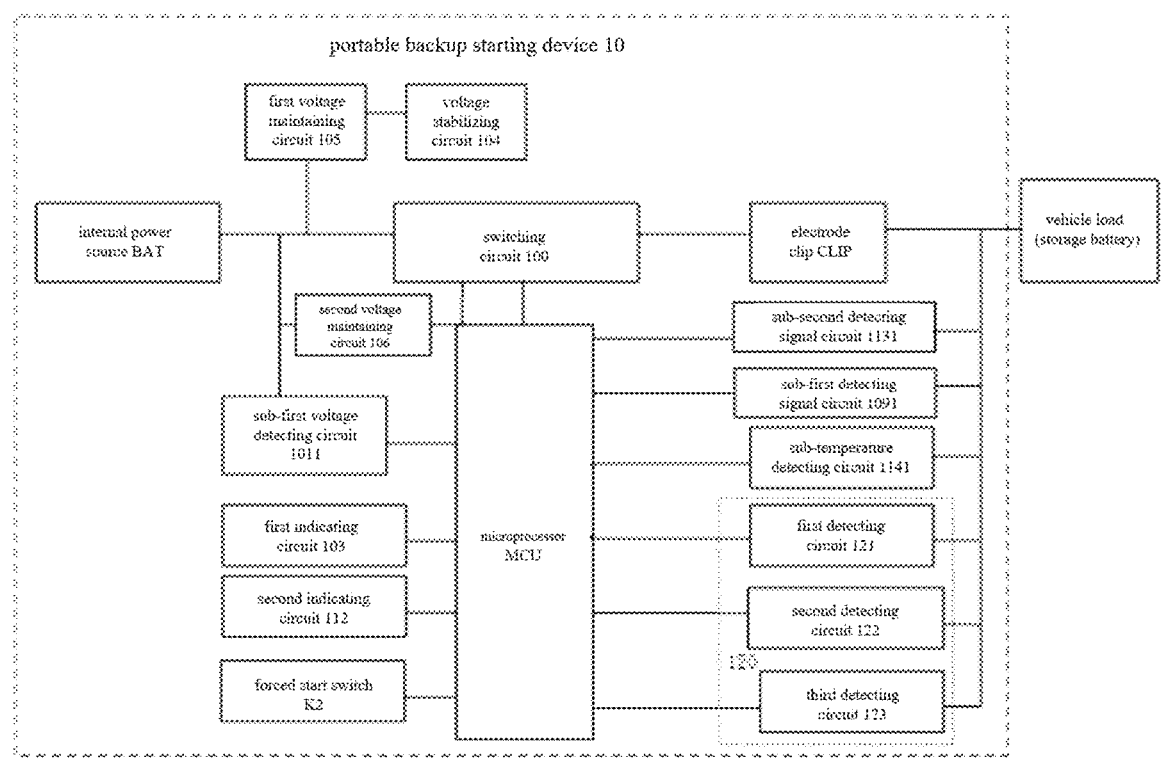
FIG. 4 shows a third structure schematic diagram of a portable backup starting device for vehicle of the embodiments of the present disclosure.

Additionally, in order to stabilize the voltage output from the internal power source BAT and decrease the fluctuation, in some other embodiments, as shown in FIG. 1, FIG. 2, or FIG. 4, the portable backup starting device 10 for vehicle further includes the voltage stabilizing circuit 104. The voltage stabilizing circuit 104 is coupled to the internal power source BAT to supply power to the switching circuit 100 and the first voltage detecting circuit 101. For example, the voltage stabilizing circuit 104 provides a voltage in the range of 2.0-6.0V, which specifically may be 2.7V, 3.3V, 5V, and other values.

For example, as shown in FIG. 3, the voltage stabilizing circuit 104 includes a voltage stabilizing chip U1, capacitors C1, C2, and C3, and a resistance R1, and is configured to stably output (e.g., 5V, etc.) the input voltage, so as to supply power to the microprocessor MCU and each unit circuit in the device.

Further, optionally, in order to increase the reliability of the above voltage stabilizing circuit 104, the portable backup starting device 10 for vehicle further includes a first voltage maintaining circuit 105. The first voltage maintaining circuit 105 is coupled to the internal power source BAT and the voltage stabilizing circuit 104 for preventing a sudden change in the input voltage of the voltage stabilizing circuit 104. For example, in one embodiment, this first voltage maintaining circuit 105 includes one capacitor and one diode, wherein the negative electrode of the diode is coupled to the positive electrode of the capacitor. As shown in FIG. 2, when voltage of the internal power source BAT is pulled down during the process of starting the vehicle, the first voltage maintaining circuit 105 consisted of the diode D1 and the capacitor C4 maintains the stability of the system power supply for a certain duration, wherein the output voltage usually ranges from 2.5V to 13.0V, and the typical value is 5.0V.

Additionally, the voltage of the internal power source BAT may be pulled down due to the large-current discharge during the starting process of the vehicle. For example, the voltage of the internal power source BAT is 12V. When the output current is 400 A, the voltage will be instantly pulled down to about 7V, and this voltage will even be pulled down to 1~2V at the winter under the low temperature. It will result in that the system power supply voltage is seriously insufficient at this time because the voltage is too low, and the switching circuit 100 cannot be reliably maintained open. Therefore, it needs to ensure the reliability of the input voltage of the switching circuit 100 through the corresponding technologies. For example, the following methods can meet the conditions to solve the above problem. The method one is to design a voltage maintaining circuit that can maintain the voltage for a certain duration; the method two is to select (or design) an electronic switch that can still maintain stable turning on after starting and under a very low voltage; and the method three is to select an electronic switch that operates at a lower voltage, which can add a step-down circuit to supply power for the electronic switch if necessary.

In some embodiments, referring to the above FIG. 1, FIG. 2, or FIG. 4, the portable backup starting device 10 for vehicle further includes a second voltage maintaining circuit 106. The second voltage maintaining circuit 106 is coupled to the internal power source BAT and the switching circuit 100 for preventing the sudden change in the input voltage of the switching circuit 100. For example, in one embodiment, the second voltage maintaining circuit 106 includes one capacitor and one diode, wherein the negative electrode of the diode is coupled to the positive electrode of the capacitor. As shown in FIG. 2, the second voltage maintaining circuit 106 is consisted of the diode D6 and capacitor C12. The switching circuit 100 is maintained to conduct in a certain duration (in which the typical value is larger than 10 ms), wherein the duration is determined by the capacity of the capacitor C12.

When the vehicle load is connected and the switching circuit 100 conducts normally, for safety reasons, the portable backup starting device 10 for vehicle of the present disclosure will also monitor the output current of the internal power source BAT in real time considering that the excessive current and other abnormal conditions will occur in the internal power source BAT after conducting, so as to disconnect the connection in time when occurring the abnormal conditions.

In some other embodiments, referring to FIG. 1 above, exemplarily, the portable backup starting device 10 for vehicle further includes a first current detecting circuit 107. The switching circuit 100 is coupled to the first current detecting circuit 107. The first current detecting circuit 107 is coupled to the first electrode or the second electrode, and the first current detecting circuit 107 is configured to detect the first current passing through the first current detecting circuit 107 after the switching circuit 100 conducts. The switching circuit 100 is coupled to the first current detecting circuit 107 to disconnect the connection between the internal power source BAT and the vehicle load when the first current meets a fourth preset condition.

The fourth preset condition may be that the first current is larger than or equal to 1000 A, for example, it specifically may be 1100 A, 1200 A, and 1300 A, etc.

In one embodiment, as shown in FIG. 2, the first current detecting circuit 107 includes a sub-first current detecting circuit 1071 and a microprocessor MCU, wherein the sub-first current detecting circuit 1071 is coupled to the first electrode or the second electrode for detecting the first current passing through the first current detecting circuit 107 after the switching circuit 100 conducts; and the microprocessor MCU is coupled to the switching circuit 100 and the sub-first current detecting circuit 1071, and controls the switching circuit 100 to disconnect when the first current meets the fourth preset condition.

For example, the sub-first current detecting circuit 1071 may acquire current signals by using a shunt resistor or other devices; and then the acquired current signals are transmitted to the microprocessor MCU by means of differential routing, so that the microprocessor MCU reads and calculates the size of the first current, and controls the switching circuit 100 to be disconnected when the first current is larger than or equal to the preset current threshold value. It will be understood that when detecting the current, besides the shunt resistor, it can use devices that can acquire the current such as a Hall current sensor, current transformer, and conductor, which is not limited herein.

Alternatively, in some other embodiments, the first current detecting circuit 107 includes a first current acquiring circuit 1072 and a first circuit 1073, wherein the first current acquiring circuit 1072 is coupled to the first electrode or the second electrode for acquiring the first current, and the first circuit 1073 is coupled to the first current acquiring circuit 1072 and the switching circuit 100 for determining whether or not the first current meets the fourth preset condition, wherein the first current acquiring circuit 1072 may be composed of the devices such as a shunt resistor, Hall current sensor, current transformer, and conductor. The first circuit 1073 may be a microprocessor MCU with the function of analog to digital (i.e., ADC), or may be composed of the devices such as a discrete ADC module and a comparator, which are not specifically limited herein. It only needs to acquire the first current and compare it with the preset current value and to obtain a control signal for controlling the switching circuit 100.

For example, as shown in FIG. 3, the first current acquiring circuit 1072 includes a shunt resistor R25, and the first circuit 1073 includes a triode Q5, resistances R23 and R21, and a microprocessor MCU, wherein when the first current exceeds the threshold value I1, the triode Q5 conducts and outputs a level signal to the 10th pin of the microprocessor MCU, and the microprocessor MCU will rapidly output an off signal to the switching circuit 100 to immediately disconnect the output. Generally, the response duration (denoted as T1) shall be shorter to ensure a fast response, wherein the threshold value I1 is generally larger than 800 A, and the typical value is 1000 A; and the typical value T1 is smaller than 100 ms.

Considering that it may need to manually force the device to start, in some other embodiments, exemplarily, the portable backup starting device 10 for vehicle further includes a forced start switch K2, and the second voltage detecting circuit 102 includes the sub-second voltage detecting circuit 1021 and the microprocessor MCU, wherein the sub-second voltage detecting circuit 1021 is coupled to the first electrode clip, the second electrode clip, and the microprocessor MCU for detecting the second voltage between the first end and second end before the switching circuit 100 conducts; and the microprocessor MCU is coupled to the switching circuit 100, the first voltage detecting circuit 101, and the forced start switch K2. When the switching circuit 100 is not conducted in a situation that the first voltage does not meet the first preset condition, the second voltage is a forward voltage and the resistance value of the equivalent resistance RL corresponding to the externally accessed vehicle load calculated by the voltage value output from the third voltage detecting circuit 108 is in the normal range (such as larger than or equal to 1Ω), after manually pressing the forced start switch K2, the microprocessor MCU directly controls the switching circuit 100 to conduct, or controls the switching circuit 100 to conduct when detecting that the voltage between the first end and second end of the vehicle load produces a certain voltage drop value. It will be understood that the microprocessor MCU can control the switching circuit 100 to conduct based on the operating for the forced start switch K2 only when cases that the first voltage does not meet the first preset condition, the second voltage is the forward voltage, and the resistance value of the equivalent resistance RL corresponding to the vehicle load is in the normal range occur simultaneously.

Exemplarily, the forced start switch K2 may be realized by a key, which specifically may be connected to one of the pins of the microprocessor MCU. For example, when the voltage between the first end and the second end of the vehicle load drops from UC1 to UC2 to produce a voltage drop value UCD (UCD=UC1−UC2), and the voltage drop value UCD is larger than or equal to the voltage drop threshold value UC3 (in which the range is usually 0.5V~2V, and the typical value is 1V), it indicates that the voltage drop is caused by the vehicle ignition. In order to ensure the normal starting of the vehicle, the microprocessor MCU needs to output the control signal to conduct the switching circuit 100 within a duration TO, so that the internal power source BAT supplies power to the vehicle, wherein the typical value of the duration TO is smaller than 100 ms. It will be understood that the switching circuit 100 does not conduct if the voltage drop value UCD is smaller than UC3, which can prevent the error operation due to interference.

In some other embodiments, the portable backup starting device 10 for vehicle further includes the third voltage detecting circuit 108. The third voltage detecting circuit 108 is coupled to the switching circuit 100, the first electrode clip, and the second electrode clip for detecting the third voltage and/or the voltage drop between the first end and the second end before the switching circuit 100 conducts. The switching circuit 100 does not conduct when the first voltage meets the first preset condition, the third voltage meets the fifth preset condition, or the voltage drop meets the sixth preset condition. The third voltage between the first end and second end of the vehicle load can be acquired by using the resistances to divide the voltage, or the voltage sensor, etc.

When the third voltage is detected, the fifth preset condition may be that the third voltage is a forward voltage and the third voltage is smaller than or equal to 9V, which indicates that the voltage of the vehicle load is insufficient; or when the voltage drop is detected, the sixth preset condition may be that the voltage drop is smaller than 1V. It is to be understood that when any one of the three conditions occurs, e.g., the first voltage meets the first preset condition, the third voltage meets the fifth preset condition, or the voltage drop between the first end and the second end meets the sixth preset condition, it needs to control the switching circuit 100 to not conduct.

In one embodiment, as shown in FIG. 2, the third voltage detecting circuit 108 includes the first detecting signal circuit 109, the sub-third voltage detecting circuit 1081, and the microprocessor MCU, wherein the first detecting signal circuit 109 is coupled to the first electrode clip or the second electrode clip for providing the first signal to the first end and the second end before the switching circuit 100 conducts; the sub-third voltage detecting circuit 1081 is coupled to the first electrode clip and the second electrode clip for detecting the third voltage and/or the voltage drop between the first end and the second end according to the first signal before the switching circuit 100 conducts; and the microprocessor MCU is coupled to the switching circuit 100 and the sub-third voltage detecting circuit 1081. The switching circuit 100 is controlled not to conduct when the first voltage meets the first preset condition, the third voltage meets the fifth preset condition, or the voltage drop meets the sixth preset condition, wherein the first signal may be used to assist in determining whether the first electrode clip and the second electrode clip are normally connected to the vehicle load.

For example, as shown in FIG. 3, the third voltage detecting circuit 108 includes the first detecting signal circuit 109 composed of the triode Q4, the MOS transistor Q1, the resistances R12, R11, and R3, and the diode D3, the sub-third voltage detecting circuit 1081 composed of the resistances R4 and R8, and the microprocessor MCU. The specific detecting process is as follows. Firstly, the 11th pin of the microprocessor MCU outputs a low level to the first resistance detecting circuit 111, so that the MOS transistor Q1 in the first detecting signal circuit 109 is cut off. The second pin of the microprocessor MCU reads the voltage value of the sub-third voltage detecting circuit 1081 at this time to calculate the voltage value UC1 of the vehicle load, wherein when the voltage value UC1 is in a reasonable range (the typical value range is 1V~15V), the microprocessor MCU determines that the electrode CLIP has been connected to the vehicle load normally. Next, it is to determine the size of the voltage value UC1 again, wherein when the voltage UC1 is larger than the threshold value UC2 (the range of UC2 is 8~11V, and the typical value is 9V), the microprocessor MCU controls the switching circuit 100 to conduct when detecting that the voltage between the first end and the second end of the vehicle load produces a certain voltage drop value. If the voltage value UC1 is smaller than or equal to the threshold value UC2, it indicates that the vehicle load is in a low voltage state. The user needs to manually press the forced start switch K2 in this state, so that the portable backup starting device 10 for vehicle enters the forced start mode. Further, when the voltage value UC1 is zero (e.g., no voltage value is read, which indicates that the vehicle load does not exist, or the vehicle load is not connected in), the 11th pin of the microprocessor MCU will output the high level to the first detecting signal circuit 109 at this time. The MOS transistor Q1 in the first detecting signal circuit 109 conducts at this time, and outputs a voltage value to the sub-third voltage detecting circuit 1081. Next, the 2nd pin of the microprocessor MCU reads the voltage value output from the sub-third voltage detecting circuit 1081, and the equivalent resistance RL corresponding to the externally accessed vehicle load is calculated according to the voltage value. If the equivalent resistance RL is of a very low resistance value (e.g., close to 0Ω, and the typical value of RL is smaller than 1Ω), the 12th pin controls the microprocessor MCU controls the switching circuit 100 not to conduct. Conversely, if the resistance value of the equivalent resistance RL is in the normal range (e.g., larger than or equal to 1Ω), it determines that the first electrode clip and the second electrode clip are normally connected to the vehicle load, and the 12th pin of the microprocessor MCU outputs the high level to control the switching circuit 100 to conduct.

Of course, in some other embodiments, the above first detecting signal circuit 109 may be independent of the third voltage detecting circuit 108 and arranged in the portable backup starting device 10 for vehicle, so as to control the switching circuit 100 to conduct or not to conduct based on the second voltage and the first signal. Exemplarily, the portable backup starting device 10 for vehicle further includes the first detecting signal circuit 109, wherein the first detecting signal circuit 109 is coupled to the switching circuit 100, the first electrode clip, and the second electrode clip for providing the first signal to the first end and the second end before the switching circuit 100 conducts. When the first voltage does not meet the above first preset condition and the second voltage does not meet the second preset condition, the switching circuit 100 selectively connects the internal power source BAT to the vehicle load based on the second voltage and the first signal.

For example, when the microprocessor MCU outputs the first signal of low level, and when the second voltage is in a reasonable range (the typical value range is 1V~15V), the switching circuit 100 is controlled to conduct to connect the internal power source BAT to the vehicle load; and when the second voltage is smaller than the preset voltage threshold value or is zero, the switching circuit 100 is not conducted at first. Next, after the first signal of high level is output, the equivalent resistance of the vehicle load may be detected based on the second voltage read again, so as to determine whether the first electrode clip and the second electrode clip are normally connected to the vehicle load, and thus control whether to conduct the switching circuit 100.

In one embodiment, as shown in FIG. 4, the first detecting signal circuit 109 includes the sub-first detecting signal circuit 1091 and the microprocessor MCU, wherein the sub-first detecting signal circuit 1091 is coupled to the first electrode clip and the second electrode clip for providing the first signal to the first end and the second end before the switching circuit 100 conducts; and the microprocessor MCU is coupled to the switching circuit 100 and the sub-first detecting signal circuit 1091, so as to control the switching circuit 100 to conduct or not to conduct based on the second voltage and the first signal when the first voltage does not meet the first preset condition and the second voltage does not meet the second preset condition. For example, as shown in FIG. 3, the sub-first detecting signal circuit 1091 includes the triode Q4, the MOS transistor Q1, resistances R12, R11, and R3, and the diode D3, etc.

In some other embodiments, the portable backup starting device 10 for vehicle further includes a second duration control circuit. The third voltage detecting circuit 108 is configured to detect the third voltage and the voltage drop between the first end and the second end before the switching circuit 100 conducts. The second duration control circuit is coupled to the switching circuit 100, and the second duration control circuit is configured to start calculating the second duration when the first voltage does not meet the first preset condition, the third voltage does not meet the fifth preset condition, or the voltage drop does not meet the sixth preset condition, wherein the switching circuit 100 conducts when the second duration meets the seventh preset condition. For example, the second duration control circuit may be the microprocessor MCU, or it may also be a timing module, etc.

The seventh preset condition may be that the second duration is smaller than or equal to 100 ms. It will be understood that when it is determined that the internal power source BAT voltage, and the third voltage or voltage drop between the first end and the second end of the vehicle load meet the conduction condition, the switching circuit 100 is controlled to conduct timely in a duration within 100 ms.

As an alternative solution, it is different from the above embodiment that the second duration starts at a different time. In some other embodiments, the portable backup starting device 10 for vehicle further includes the second duration control circuit. The second duration control circuit is coupled to the switching circuit 100, and the second duration control circuit is configured to start calculating the second duration after the first voltage does not meet the first preset condition, wherein the switching circuit 100 conducts when the second duration meets the seventh preset condition. It is to be understood that in the embodiment, the second duration control circuit starts timing as long as it is determined that the internal power source BAT is not in the under voltage state, and then the switching circuit 100 is controlled to conduct in time within a certain duration.

Considering that the portable backup starting device 10 for vehicle may have an excessive output current after the switching circuit 100 conducts, the device is further provided with the current detecting circuit for timely protecting the internal power source BAT when the current is excessive, so as to detect the current output from the internal power source BAT.

In some other embodiments, the portable backup starting device 10 for vehicle further includes the second current detecting circuit 110. The second current detecting circuit 110 is coupled to the first electrode or the second electrode for detecting the second current passing through the second current detecting circuit 110 after the switching circuit 100 conducts. The switching circuit 100 is coupled to the second current detecting circuit 110 for disconnecting the internal power source BAT from the vehicle load when the second current meets the eighth preset condition and a lasting duration of the second current meets the ninth preset condition.

The eighth preset condition may be that the second current is larger than or equal to 300 A. The ninth preset condition may be that the lasting duration of the second current is larger than 10 ms.

In one embodiment, the second current detecting circuit 110 includes the sub-second current detecting circuit 1101 and the microprocessor MCU. The sub-second current detecting circuit 1101 is coupled to the first electrode or the second electrode for detecting the second current passing through the second current detecting circuit 110 after the switching circuit 100 conducts. The microprocessor MCU is coupled to the switching circuit 100 and the sub-second current detecting circuit 1101, and controls the switching circuit 100 to disconnect when the second current meets the eighth preset condition and the lasting duration of the second current meets the ninth preset condition.

For example, as shown in FIG. 3, the sub-second current detecting circuit 1101 includes resistances R18 and R20, wherein the 5th pin of the microprocessor MCU is connected to a series node between the resistances R18 and R20. Optionally, the 5th pin of the microprocessor MCU is further grounded by one capacitor C10. The work process is as follows. The 5th pin of the microprocessor MCU reads the voltage signal output from the resistance R20, and further calculates the size of the corresponding second current. Next, the microprocessor MCU starts timing when detecting that the second current reaches the preset current threshold value I2. After a duration of T3, the 12th pin of the microprocessor MCU outputs a shutdown signal to the switching circuit 100 to stop the output. For example, the duration T3 is usually 1s-120s, and the typical value is 5s; and the current threshold value I2 is usually 50 A-200 A, and the typical value is 100 A.

In another embodiment, the second current detecting circuit 110 includes a second current acquiring circuit 1102 and a second circuit 1103 (both not shown in the figure). The second current acquiring circuit 1102 is coupled to the first electrode or the second electrode for acquiring the second current. The second circuit 1103 is coupled to the second current acquiring circuit 1102 and the switching circuit 100 for determining whether the second current meets the fourth preset condition.

The second current acquiring circuit 1102 may adopt the structure of the sub-second current detecting circuit 1101 as shown in FIG. 3, i.e., including the resistances R18 and R20. The second circuit 1103 may adopt the first circuit 1073 as shown in FIG. 3, i.e., including the triode Q5, the resistances R23 and R21, and the microprocessor MCU. Specifically, the 10th pin of the microprocessor MCU is connected to the triode Q5 in the second circuit; and when the second current is detected to reach the current threshold value I3 and maintains for a certain duration T2, the 12th pin of the microprocessor MCU outputs the shutdown signal to the switching circuit 100 to stop the output. The current threshold value I3 is usually 400 A-1000 A, and the typical value is 500 A; and the duration T2 is usually 10 ms-1s, and the typical value is 300 ms. It will be understood that the response duration allowed for the second current may be longer than the response duration allowed for the first current.

It is worth noting that for the first circuit 1073 in the first current detecting circuit 107 and the second circuit 1103 in the second current detecting circuit 110 described above, due to the same structure, the first current detection and the second current detection for the internal power source BAT can be realized preferably by time multiplexing (i.e., sharing the same circuit) for the circuit during the actual use.

Further, optionally, the first current detecting circuit 107 and/or the second current detecting circuit 110 in the device of the embodiment will be calibrated due to certain errors in the devices. It will be understood that the current measurement accuracy can be improved by first disconnecting the circuit where the first current detecting circuit 107 and/or the second current detecting circuit 110 are located, and measuring the voltage to serve as a zero point, and then acquiring the voltage value when conducting the circuit to obtain the calibrated voltage value by calculating a difference value.

Taking the first current detecting circuit 107 shown in FIG. 3 as an example, exemplarily, the microprocessor MCU calibrates the connected first current detecting circuit 107 by the 5th pin when powering on each time, wherein the method is as follows. When powering on, the 11th pin and the 12th pin of the microprocessor MCU are both closed, so that the first current detecting circuit is disconnected. Then, the 5th pin of the microprocessor MCU reads the present voltage value UI0 on two ends of the shunt resistor R25, and the voltage value UI0 is taken as the zero point. After the switching circuit 100 is turned on to form a loop, the current passes through the shunt resistor R25 and generates the voltage value UI1. The zero value UI0 is subtracted, such that the actual current value Io can be calculated by dividing (UI1-UI0) by the resistance value of the shunt resistor R25.

In some other embodiments, exemplarily, the portable backup starting device 10 for vehicle further includes the first resistance detecting circuit 111. The first resistance detecting circuit 111 is coupled to the switching circuit 100, the first electrode clip, and the second electrode clip for detecting the resistance value of the vehicle load before the switching circuit 100 conducts. The switching circuit 100 does not conduct when the first voltage meets the first preset condition or the resistance value meets the tenth preset condition, wherein the tenth preset condition is that the resistance value above is smaller than 1Ω.

In one embodiment, as shown in FIG. 2, the first resistance detecting circuit 111 includes the sub-first resistance detecting circuit 1111 and the microprocessor MCU. The sub-first resistance detecting circuit 1111 is coupled to the first electrode clip and the second electrode clip for detecting the resistance value of the vehicle load before the switching circuit 100 conducts. The microprocessor MCU is coupled to the switching circuit 100 and the sub-first resistance detecting circuit 1111 for controlling the switching circuit 100 not to conduct when the first voltage meets the first preset condition or the resistance value meets the tenth preset condition. It will be understood that the microprocessor MCU herein is primarily used to acquire the resistance value of the vehicle load and to control the switching circuit 100 by determining different conditions. Of course, this function of the microprocessor MCU can also be realized by discrete devices, and this is only a realizable example herein.

For example, the above first resistance detecting circuit 111 may be realized by adopting the same structure as the above third voltage detecting circuit 108, wherein the first resistance detecting circuit 111 includes the triode Q4, the MOS transistor Q1, the resistance R12, R11, and R3, the diode D3, the resistance R4, and the resistance R8, and the microprocessor MCU as shown in FIG. 3, etc. During the practical applications, if the device includes the third voltage detecting circuit 108, the above third voltage detecting circuit 108 may be reused to detect the resistance value of the vehicle load, and it does not need to additionally provide the first resistance detecting circuit 111, so as to simplify the circuit and reduce the costs.

In some other embodiments, the portable backup starting device 10 for vehicle further includes the second indicating circuit 112, and the first resistance detecting circuit 111 includes the sub-first resistance detecting circuit 1111 and the microprocessor MCU. The sub-first resistance detecting circuit 1111 is coupled to the first electrode clip and the second electrode clip for detecting the resistance value of the vehicle load before the switching circuit 100 conducts. The microprocessor MCU is coupled to the switching circuit 100, the sub-first resistance detecting circuit 1111, and the second indicating circuit 112, wherein the second indicating circuit 112 makes the sounds and/or generates the lights when the resistance value meets the tenth preset condition.

As shown in FIG. 3, the second indicating circuit 112 includes the light-emitting diode LED1 and the resistance R15. It can be seen that the microprocessor MCU acquires the size of the resistance value of the equivalent resistance RL corresponding to the vehicle load. If the resistance value of the equivalent resistance RL is very low (close to 0Ω, with a typical value smaller than 1Ω), the 15th pin of the microprocessor MCU outputs the high level, so that the light-emitting diode LED1 of the second indicating circuit 112 generates a green indication signal. Of course, it can be understood that the light-emitting diode in the second indicating circuit 112 is not limited to LED1. Further, it may include other light-emitting diodes. As shown in FIG. 3, the 16th pin of the microprocessor MCU is connected externally to a red light-emitting diode LED2. It is to be understood that the green light-emitting diode LED1 externally connected to the 15th pin is used to indicate the status when the connection is correct; and the red light-emitting diode LED2 connected to the 16th pin is used to indicate the status when the connection is error. Additionally, the color of the light-emitting diode in the present disclosure is not uniquely limited, for example, some may be green, and some may be, for example, yellow, purple, etc. During the actual process, the user may use the light-emitting diodes in different colors to indicate different states according to the actual demands, which is not limited herein.

As an optional embodiment, the portable backup starting device 10 for vehicle further includes the second detecting signal circuit 113 (not shown in the figure). The second detecting signal circuit 113 is coupled to the switching circuit 100, the first electrode clip, and the second electrode clip for providing the second signal to the first end and the second end before the switching circuit 100 conducts. The switching circuit 100 selectively connects the internal power source BAT to the vehicle load based on the first voltage and the second signal when the first voltage does not meet the first preset condition.

In one embodiment, as shown in FIG. 4, the second detecting signal circuit 113 includes the sub-second detecting signal circuit 1131 and the microprocessor MCU. The sub-second detecting signal circuit 1131 is coupled to the first electrode clip and the second electrode clip for providing the second signal to the first end and the second end before the switching circuit 100 conducts. The microprocessor MCU is coupled to the switching circuit 100 and the sub-second detecting signal circuit 1131, and controls the switching circuit 100 to conduct or not to conduct based on the first voltage and the second signal when the first voltage does not meet the first preset condition.

As shown in FIG. 5, the second detecting signal circuit 113 includes the sub-second detecting signal circuit 1131 composed of the resistances R22, R26, R2, and R27, and the MOS transistor Q10, and a microprocessor MCU, wherein the 6th pin of the microprocessor MCU outputs signals to control the MOS transistor Q10 to conduct or disconnect. Therefore, the MOS transistor Q10 generates different voltage values in the different states, so as to provide the second signal. For example, the Q10 is used to generate the first voltage value UH when disconnecting, and the Q10 is used to generate the second voltage value UL when conducting. Further, the microprocessor MCU determines whether to conduct the switching circuit 100 according to the first voltage value UH and the second voltage value UL. It can be understood that the above second signal includes two different states of conducting and disconnecting of the MOS transistor 10.

In some other embodiments, in the case of including the above second detecting signal circuit 113, as shown in FIG. 4, the portable backup starting device 10 for vehicle further includes a common detecting circuit 120, including the first detecting circuit 121, the second detecting circuit 122, and the third detecting circuit 123 for specifically determining whether to conduct the switching circuit 100 by detecting the size of different levels of voltage.

For example, as shown in FIG. 5, the first detecting circuit 121 includes the resistances R12, R15, R5, R7, and R17, the voltage regulator diode ZD3, and capacitor C5, and is used to detect the higher voltage. The second detecting circuit 122 includes the resistances R16 and R8, capacitor C3, and voltage regulator diode ZD1, and is used to detect the normal (e.g., 12V) voltage. The third detecting circuit 123 includes the resistances R3 and R9, the voltage regulator diode ZD2, and capacitor C4, and is used to detect the lower voltage, such as detecting the voltage when the current reaches 1000 A. The voltage regulator diodes ZD1, ZD2, and ZD3 are used for limiting and clamping the voltage, so as to prevent the microprocessor MCU from being damaged due to excessive voltage.

Specifically, the 6th pin of the microprocessor MCU outputs the low level; the MOS transistor Q10 of the first detecting circuit conducts; and the 9th, 10th, and 11th pins of the microprocessor MCU read the values U1L, U2L, and U3L of the first to the third detecting circuits respectively, so as to acquire the voltage value UL. The value UL is determined in following ways. If U1L is not beyond the range, UL=U1L, and if U1L is beyond the range, U2L is read; and then if U2L is not beyond the range, UL=U2L, and if U2L is beyond the range, U3L is read, and UL=U3L. The 6th pin of the microprocessor MCU outputs the high level; the MOS transistor Q10 conducts; and the 9th, 10th, and 11th pins of the microprocessor MCU respectively read the value U1H, U2H, and U3H of the three detecting circuits, so as to acquire the voltage value UH (the value acquiring method for UH is the same as that of the UL). When UH is about equal to the voltage of the internal power source BAT and UL is about equal to 0 V, it determines to be no-load; when UH is about equal to the voltage of the internal power source BAT and UL is about equal to UH, it determines that the resistance value of the vehicle load before the switching circuit 100 conducts is smaller than 1Ω; and when UH is larger than the voltage of the internal power source BAT and UL is larger than the voltage of the internal power source BAT, it determines that the first electrode clip and the second electrode clip are in a second connection state with the first end and second end of the vehicle load.

In the present disclosure, the switching circuit 100 in the portable backup starting device 10 for vehicle can be realized in multiple solutions.

For example, in the first embodiment, the switching circuit 100 includes a first drive switch, a second drive switch, and a first switch K1. The first drive switch is coupled to the first voltage detecting circuit 101 and the first switch K1; the second drive switch is coupled to the second voltage detecting circuit 102 and the first switch K1; and the first switch K1 is coupled to the second electrode clip. The first drive switch controls the first switch K1 to not conduct when the first voltage meets the first preset condition; and the second drive switch controls the first switch K1 to not conduct when the second voltage meets the second preset condition; and the first switch K1 does not conduct when the first voltage meets the first preset condition or when the second voltage meets the second preset condition. Exemplarily, the first switch K1 may be one of the relay and MOS transistor, etc., and needs to hold a current of 50 A~1000 A within 5 seconds.

Figure 9:
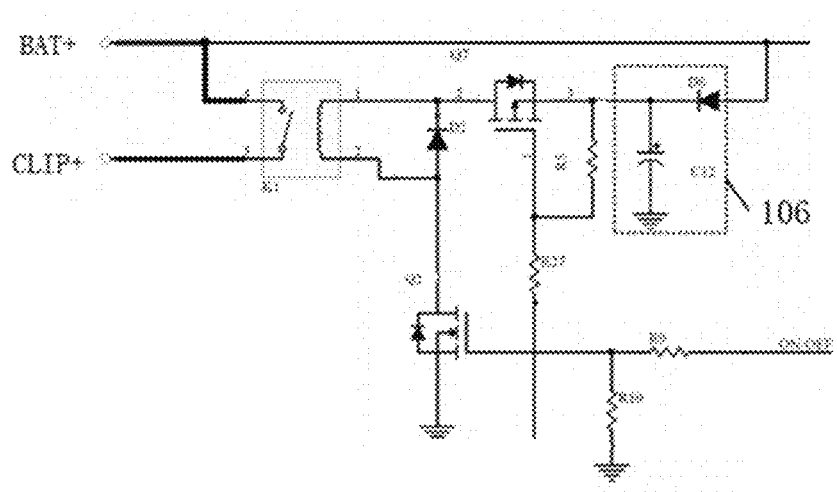
FIG. 9 shows another circuit schematic diagram of a switching circuit of the embodiments of the present disclosure.

As shown in FIG. 9, the switching circuit 100 includes MOS transistor Q7 as the first drive switch, the MOS transistor Q2 as the second drive switch, and the first switch K1. Additionally, it further includes some peripheral devices required, such as the resistances R5, R9, and R10, and the diode D2. One end of the first switch K1 is connected to the electrode clip CLIP, and the other end is used to connect to the internal power source BAT. The MOS transistor Q2 is coupled to the first switch K1, wherein the control end of the MOS transistor Q7 and the input end of the resistance R9 are used to access corresponding control signals respectively. For example, when a low voltage of the internal power source BAT is detected, a control signal may be generated from the first voltage detecting circuit 101 to the MOS transistor Q7 to control the first switch K1 not to conduct. Alternatively, when detecting that the voltage on two ends of the vehicle load is a reverse voltage, or is a forward voltage but the size of the forward voltage does not meet the requirement of forward conduction, a control signal may be generated from the second voltage detecting circuit 102 to the MOS transistor Q2 to control the first switch K1 not to conduct. It can be understood that when the solution containing the microprocessor is adopted in the first voltage detecting circuit 101 or the second voltage detecting circuit 102, the corresponding control signal may be sent by the microprocessor MCU to the corresponding MOS transistor Q7 or MOS transistor Q2.

Optionally, in a second embodiment, the switching circuit 100 includes the first drive switch, the second drive switch, the third drive switch, and the first switch K1. The third drive switch is coupled to the second voltage detecting circuit 102 and the second drive switch, and the second drive switch is coupled to the first switch K1. The first drive switch is coupled to the first voltage detecting circuit 101 and the first switch K1, and the first switch K1 is coupled to the second electrode clip. The third drive switch controls the second drive switch not to conduct when the second voltage meets the second preset condition; the first drive switch does not conduct when the first voltage meets the first preset condition; and the first switch K1 does not conduct when the first voltage meets the first preset condition or the second voltage meets the second preset condition.

Based on the FIG. 9, the switching circuit 100 further includes the triode Q3 as the third drive switch, the triode Q8, and the required resistances R13, R27, R14, and R28. As shown in FIG. 3, when the second voltage detecting circuit 102 detects that the output voltage on the second electrode clip is lower than the reference voltage, it will output a high level, so as to control the first switch K1 not to conduct by the third drive switch.

Optionally, in a third embodiment, the switching circuit 100 includes the first drive switch and the first switch K1. The first drive switch is coupled to the first voltage detecting circuit 101 and the first switch K1, wherein the first switch K1 is coupled to the second electrode clip, and the first drive switch controls the first switch K1 not to conduct when the first voltage meets the first preset condition. It may be understood that in the embodiment, besides sent from the first voltage detecting circuit 101, the control signal of the first drive switch may be sent from one or a combination of more of the above second voltage detecting circuit 102, the third voltage detecting circuit 108, the first duration control circuit, the first current detecting circuit 107, the second current detecting circuit 110, the first detecting signal circuit 109, the second detecting signal circuit 113, etc., which depends on the actual circuit design of the device, and will not be limited herein.

As shown in FIG. 5, the switching circuit 100 includes a MOS transistor Q6 as the first drive switch, the resistances R1 and R31, the diode D3, and other peripheral devices. The MOS transistor Q6 controls the first switch K1 to conduct or not to conduct when receiving different control signals. For example, when the first voltage detecting circuit 101 detects a low voltage in the internal power source BAT, the MOS transistor Q6 controls the first switch K1 to not conduct. The MOS transistor Q6 herein can also be realized by the triode, etc., and is not limited herein.

In some other embodiments, exemplarily, the portable backup starting device 10 for vehicle further includes a temperature detecting circuit 114. The temperature detecting circuit 114 is coupled to the switching circuit 100 for detecting the temperature of the switching circuit 100. The switching circuit 100 does not conduct when the first voltage meets the first preset condition or the temperature meets the eleventh preset condition. For example, the above temperature detecting circuit 114 includes a temperature sensor, and the switching circuit 100 includes the first switch K1, wherein the temperature sensor is arranged near the first switch K1. The eleventh preset condition is that the temperature is larger than or equal to 70° C., wherein the temperature value TMP1 usually is 60° C.~120° C., and the typical value is 90° C.

In another embodiment, as in FIG. 2 or FIG. 4, the temperature detecting circuit 114 includes a sub-temperature detecting circuit 1141 and the microprocessor MCU. The sub-temperature detecting circuit 1141 is configured to detect the temperature of the switching circuit 100. The microprocessor MCU is coupled to the switching circuit 100 and the sub-temperature detecting circuit 1141, and controls the switching circuit 100 not to conduct when the first voltage meets the first preset condition or the temperature meets the eleventh preset condition.

For example, as shown in FIG. 3, the sub-temperature detecting circuit 1141 is composed of the resistance R7 and thermistor NTC1, wherein the thermistor NTC1 is placed near the first switch K1. When the temperature is too high, the resistance value of the thermistor NTC1 becomes smaller, and the 3rd pin of the microprocessor MCU calculates a temperature value from this voltage value. When the temperature rises to the temperature threshold value TMP1, the over-temperature protection action is triggered, i.e., the 12th pin of the microprocessor MCU outputs the shutdown signal or does not output the turning-on signal, so as to control the switching circuit 100 to disconnect or not to conduct.

In each of the above embodiments, various circuits may include the microprocessor MCU. During the actual use, it may use the microprocessor MCU.

The portable backup starting device 10 for vehicle of the present disclosure can effectively control the start/stop and other operations of the device when the circuit is abnormal by providing various functions for the internal power source BAT, such as voltage value detection, current value detection, and resistance detection of the vehicle load, etc., which greatly increases the safety of the present disclosure.

In the embodiments provided by the present disclosure, it should be understood that the disclosed device and method may also be realized in other ways. The embodiments of the device described above are only illustrative. For example, the flow schematic diagrams and structure schematic diagrams in the drawings show the architecture, functionality, and operation that may be realized by the device, method, and computer program product according to the plurality of embodiments of the present disclosure. At this point, each box in the flow schematic diagram or block schematic diagram may represent a module, program segment, or a part of code, and the module, program segment, or a part of the code includes one or more executable instructions for realizing specified logical functions. It should also be noted that in the embodiment as a replacement, the functions indicated in the boxes may also occur in a different order than those indicated in the drawings. For example, two consecutive boxes can actually be executed essentially in parallel, and they can sometimes be executed in reverse order, which depends on the functions involved. It is also noted that each box in the structure schematic diagram and/or flow schematic diagram, and combinations of boxes in the structure schematic diagrams and/or flow schematic diagrams, may be realized by a dedicated hardware-based system that executes the specified function or action, or may be realized by a combination of the dedicated hardware and computer instructions.

The above mentioned are only specific embodiments of the present disclosure, but the scope of protection of the present disclosure is not limited thereto. Any person skilled in the art familiar with the technical field, can easily think of variations or substitutions within the scope of the technology disclosed in the present disclosure, shall be covered by the scope of protection of the present disclosure.

What is claimed is:

1. A portable backup starting device for vehicle, comprising an internal power source, a switching circuit, a first voltage detecting circuit, a first electrode clip, a second electrode clip, and a second voltage detecting circuit, wherein the first electrode clip and the second electrode clip are configured to connect to a first end and a second end of a vehicle load;

the internal power source has a first electrode and a second electrode, wherein the first electrode is coupled to the first electrode clip, and the second electrode is coupled to the switching circuit;

the switching circuit is coupled to the second electrode clip;

the first voltage detecting circuit is coupled to the switching circuit, the first electrode, and the second electrode is configured to detect a first voltage between the first electrode and the second electrode before the switching circuit conducts, wherein the switching circuit does not conduct in response to the first voltage meeting a first preset condition, the second voltage detecting circuit is coupled to the switching circuit, the first electrode clip, and the second electrode clip is configured to detect a second voltage between the first end and the second end before the switching circuit conducts, wherein the switching circuit does not conduct in response to the first voltage meeting the first preset condition or the second voltage meeting a second preset condition, the switching circuit comprises a first drive switch, a second drive switch, and a first switch, wherein the first drive switch is coupled to the first voltage detecting circuit and the first switch; the second drive switch is coupled to the second voltage detecting circuit and the first switch; and the first switch is coupled to the second electrode clip, and the first drive switch controls the first switch not to conduct in response to the first voltage meeting the first preset condition; the second drive switch controls the first switch not to conduct in response to the second voltage meeting the second preset condition; and the first switch does not conduct in response to the first voltage meeting the first preset condition or the second voltage meeting the second preset condition.

2. The portable backup starting device for vehicle according to claim 1, wherein the first voltage detecting circuit comprises a sub-first voltage detecting circuit and a microprocessor, wherein
the sub-first voltage detecting circuit is coupled to the first electrode, the second electrode, and the microprocessor is configured to detect the first voltage between the first electrode and the second electrode before the switching circuit conducts; and
the microprocessor is coupled to the switching circuit, and controls the switching circuit not to conduct in response to the first voltage meeting the first preset condition.

3. The portable backup starting device for vehicle according to claim 1, wherein the second preset condition is that the second voltage is a reverse voltage.

4. The portable backup starting device for vehicle according to claim 1, wherein the second preset condition is that the second voltage is a forward voltage, and an absolute value of the forward voltage is smaller than or equal to 9V.

5. The portable backup starting device for vehicle according to claim 1, wherein the switching circuit further comprises a first drive switch, a second drive switch, a third drive switch, and a first switch, wherein the third drive switch is coupled to the second voltage detecting circuit and the second drive switch; the second drive switch is coupled to the first switch; the first drive switch is coupled to the first voltage detecting circuit and the first switch; and the first switch is coupled to the second electrode clip, wherein
the third drive switch controls the second drive switch not to conduct in response to the second voltage meeting the second preset condition; the first drive switch does not conduct in response to the first voltage meeting the first preset condition; and the first switch does not conduct in response to the first voltage meeting the first preset condition or the second voltage meeting the second preset condition.

6. The portable backup starting device for vehicle according to claim 1, wherein the switching circuit comprises a first drive switch and a first switch, wherein the first drive switch is coupled to the first voltage detecting circuit and the first switch, and the first switch is coupled to the second electrode clip, wherein
the first drive switch controls the first switch not to conduct in response to the first voltage meeting the first preset condition.

7. The portable backup starting device for vehicle according to claim 1, further comprising a first duration control circuit, wherein the first duration control circuit is coupled to the switching circuit, and
the first duration control circuit is configured to start calculating a first duration after the internal power source is connected to the vehicle load, wherein the switching circuit disconnects the internal power source from the vehicle load in response to the first duration meeting a third preset condition.

8. The portable backup starting device for vehicle according to claim 1, further comprising a first current detecting circuit, wherein the first current detecting circuit is coupled to the first electrode or the second electrode, and the first current detecting circuit is configured to detect a first current passing through the first current detecting circuit after the switching circuit conducts, wherein
the switching circuit is coupled to the first current detecting circuit, and disconnects the internal power source from the vehicle load in response to the first current meeting a fourth preset condition.

9. The portable backup starting device for vehicle according to claim 1, further comprising a voltage stabilizing circuit, wherein the voltage stabilizing circuit is coupled to the internal power source for supplying power to the switching circuit and the first voltage detecting circuit.

10. The portable backup starting device for vehicle according to claim 1, further comprising a third voltage detecting circuit, wherein the third voltage detecting circuit is coupled to the switching circuit, the first electrode clip, and the second electrode clip is configured to detect a third voltage and/or a voltage drop between the first end and the second end before the switching circuit conducts, wherein the switching circuit does not conduct in response to the first voltage meeting the first preset condition, the third voltage meeting a fifth preset condition, or the voltage drop meeting a sixth preset condition.

11. The portable backup starting device for vehicle according to claim 7, further comprising a second duration control circuit, wherein the second duration control circuit is coupled to the switching circuit, and the second duration control circuit is configured to start calculating a second duration after the first voltage does not meet the first preset condition, wherein the switching circuit conducts in response to the second duration meeting a seventh preset condition.

12. The portable backup starting device for vehicle according to claim 9, further comprising a first voltage maintaining circuit, wherein the first voltage maintaining circuit is coupled to the internal power source and the voltage stabilizing circuit for preventing a sudden change in an input voltage of the voltage stabilizing circuit.

13. The portable backup starting device for vehicle according to claim 12, further comprising a second voltage maintaining circuit, wherein the second voltage maintaining circuit is coupled to the internal power source and the switching circuit for preventing a sudden change in an input voltage of the switching circuit.

14. The portable backup starting device for vehicle according to claim 8, further comprising a second current detecting circuit, wherein the second current detecting circuit is coupled to the first electrode or the second electrode is configured to detect a second current passing through the second current detecting circuit after the switching circuit conducts, wherein
the switching circuit is coupled to the second current detecting circuit, and disconnects the internal power source from the vehicle load in response to the second current meeting an eighth preset condition and a lasting duration of the second current meeting a ninth preset condition.

15. The portable backup starting device for vehicle according to claim 1, further comprising a first resistance detecting circuit, wherein the first resistance detecting circuit is coupled to the switching circuit, the first electrode clip, and the second electrode clip is configured to detect a resistance value of the vehicle load before the switching circuit conducts, wherein the switching circuit does not conduct in response to the first voltage meeting the first preset condition or the resistance value meeting a tenth preset condition.

16. The portable backup starting device for vehicle according to claim 1, further comprising a first detecting signal circuit, wherein the first detecting signal circuit is coupled to the switching circuit, the first electrode clip, and the second electrode clip for providing is configured to provide a first signal to the first end and the second end before the switching circuit conducts, wherein the switching circuit selectively connects the internal power source to the vehicle load based on the second voltage and the first signal in response to the first voltage doing not meet the first preset condition and the second voltage doing not meet the second preset condition.

17. The portable backup starting device for vehicle according to claim 16, further comprising a second detecting signal circuit, wherein the second detecting signal circuit is coupled to the switching circuit, the first electrode clip, and the second electrode clip is configured to provide a second signal to the first end and the second end before the switching circuit conducts, wherein the switching circuit selectively connects the internal power source to the vehicle load based on the first voltage and the second signal in response to the first voltage doing not meet the first preset condition.

18. The portable backup starting device for vehicle according to claim 1, further comprising a temperature detecting circuit, wherein the temperature detecting circuit is coupled to the switching circuit is configured to detect a temperature of the switching circuit, wherein the switching circuit does not conduct in response to the first voltage meeting the first preset condition or the temperature meeting an eleventh preset condition.

19. The portable backup starting device for vehicle according to claim 1, further comprising a forced start switch, wherein the second voltage detecting circuit comprises a sub-second voltage detecting circuit and a microprocessor, wherein the sub-second voltage detecting circuit is coupled to the first electrode clip, the second electrode clip, and the microprocessor is configured to detect the second voltage between the first end and the second end before the switching circuit conducts; and the microprocessor is coupled to the switching circuit, the first voltage detecting circuit, and the forced start switch, wherein the switching circuit does not conduct in response to the first voltage meeting the first preset condition or the second voltage meeting the second preset condition, and the microprocessor controls the switching circuit to conduct in response to the second voltage meeting the second preset condition and the forced start switch being pressed.

* * * * *